2 Sheets—Sheet 1.
A. P. THAYER.
MOTORS FOR CARS, TRACTION-ENGINES, &c.
No. 183,081. Patented Oct. 10, 1876.
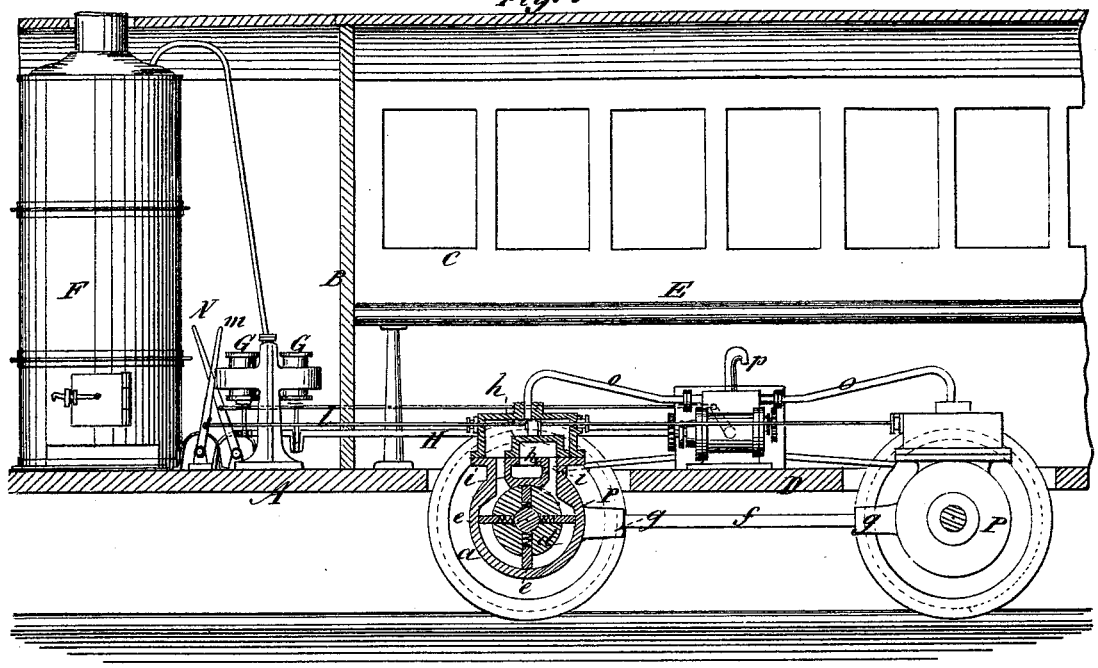
Fig. 1
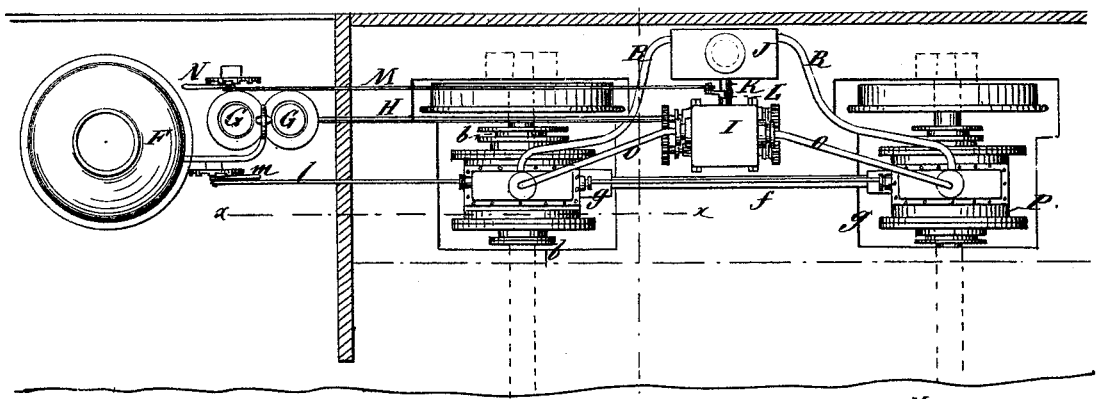
Fig. 2
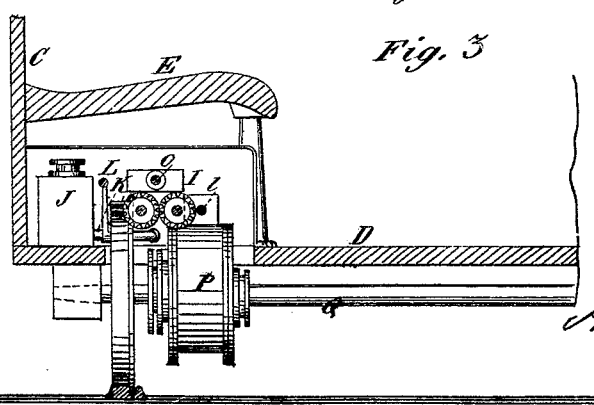
Fig. 3
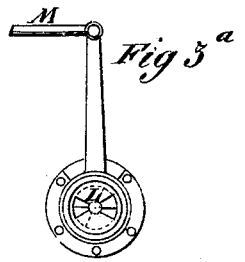
Fig. 3ᵃ
WITNESSES:
C. Neveux
C. Sedgwick
INVENTOR:
Anson P. Thayer

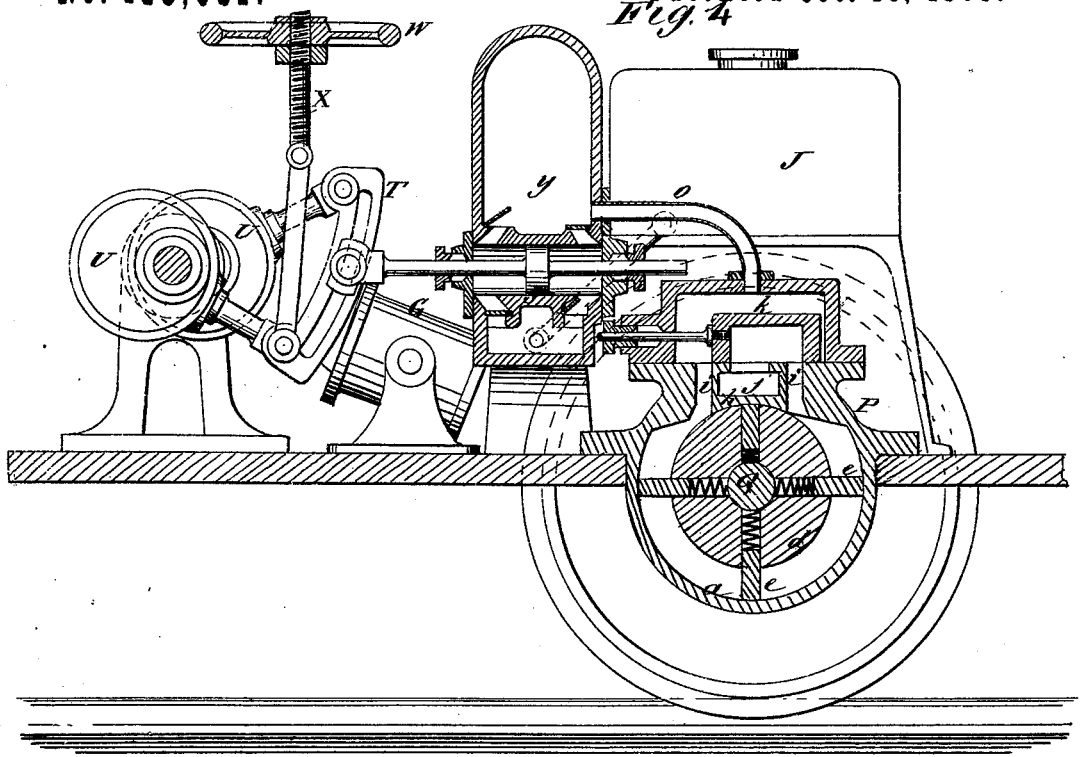
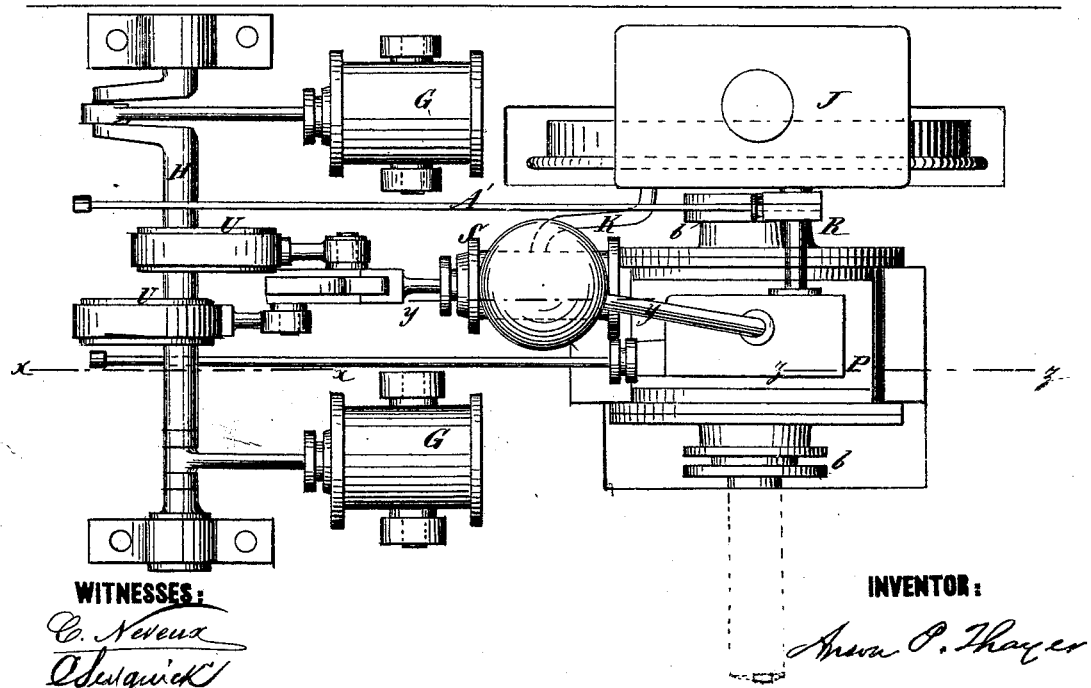

UNITED STATES PATENT OFFICE.

ANSON P. THAYER, OF NEW YORK, N. Y.

IMPROVEMENT IN MOTORS FOR CARS, TRACTION-ENGINES, &c.

Specification forming part of Letters Patent No. 183,081, dated October 10, 1876; application filed September 15, 1875.

*To all whom it may concern:*

Be it known that I, ANSON P. THAYER, of the city, county, and State of New York, have invented a new and Improved Motor for Cars, Traction-Engines, &c., of which the following is a specification:

My invention is a steam-engine or other motor, a pump, a pressure-wheel or rotary engine, and in some cases a liquid reservoir, combined and arranged to transmit power by forcing air or liquid by the pump through the pressure-wheel, and, in the case of liquid being used, back into the reservoir from which the pump takes it.

The essential objects of the invention are, first, a more simple and direct method of reducing motion from high to low speed; and, second, a simpler method of allowing the speed of the object to be driven to vary without changing the speed of the driving-engine, than the method now employed.

The machine is specially intended for driving street-cars and traction-engines, for which it is desirable to have a very small, light, and quick-running engine, in order that its weight and the strength and weight of parts on which it is mounted may be as small as possible and at the same time they require the motion to be greatly reduced at the point of application, as the wheels to which the power must be applied run comparatively slow, so that a train of wheels, whether cogged or working with belts, would require too much space, weight of material, and strength and weight of supporting devices, whereas with my machine any required amount of reduction is obtained merely by making the volume capacity of the pump as much smaller than that of the pressure-wheel, as the required reduction of the speed of the latter to the former.

But the most essential advantage of its use as a motor for cars and road-wagons lies in its facility for varying the speed of the pressure-wheel, and thereby the speed of the car or wagon-wheel, relatively to the speed of the engine and pump, which is accomplished by varying (diminishing or increasing) the volume of air or liquid which the pump is permitted to force through the pressure-wheel in a given time, or per revolution.

The object of thus varying the relative speed of the driving-engine and the car or wagon-wheels is to enable the engine to run just as fast when the car or wagon has to go slow by reason of the greater resistance of upgrades or bad roads, as when it goes fast on a level or downgrade, which an engine geared positively, or in the ordinary way, cannot do, the consequence of which is that when the car meets the greatest resistance, and has to go slow, the efficiency of the engine is diminished in the direct proportion of its reduction in speed. This I consider to be the main difficulty in the way of the use of steam on common roads, because it requires the capacity of the engine and boiler to be five or more times to drive the machine uphill than is needed on the level, and this excess makes the steam-power too expensive to compete with horse-power, and, besides, it loads the wagon too much.

Different trains of transmitting-gears—that is to say, differential gears—may, of course, be used; but they are too heavy, cumbersome, and expensive, and at the best only two, or, at most, three, changes can be had within practical limits, and however they are contrived the machine must be stopped to shift the gears, for cone-pulleys and a belt will not do for this heavy labor; and another contrivance consisting of a pawl-lever and pawl to work a ratchet-wheel on the hub of the wagon or car wheel, the connecting-rod of the engine being connected so as to shift along the lever which has been tried, will not do, because the sudden taking hold and letting go of the pawl shocks and jars the machine, the power not only acts when the lever is going one way and not the other, and the pawl is very noisy, rattling over the teeth of the ratchet-wheel.

In my motor this variation of the car or wagon wheel in speed relatively to the engine is effected merely by turning a cock or moving a valve in the pipe supplying the pump, if a rotary pump is used, or varying the throw of the piston by a link, if a reciprocating pump is used, so as to diminish the quantity of air or liquid when the speed of the car or wagon must decrease and increase it when the speed is to increase.

For the maximum speed of the car or wagon the full capacity of the pump will be employed, and the volume will be diminished just in the proportion that the speed is diminished, Whatever volume of liquid or air is transmitted will be impelled by the full power of the engine by which the pump is driven, and there will be a gain in effect on the pressure-wheel, and, consequently, on the car or wagon wheel, corresponding to its loss of speed, so that practically the leverage of the engine increases as the speed of the car or wagon diminishes. Thus a steam-engine having only capacity to drive the car or wagon up to the required speed on a level, will be enabled to exert its maximum force on the grade, no matter how much the speed of the vehicle may be diminished, and the changes of the speed of the one to the other may be graduated to each other under all conditions at the will of the engineer and without stopping the machine.

Figure 1 is a sectional elevation of my improved car-motor in one of the various forms in which it may be arranged, and in application to a street-car. Fig. 2 is a plan of Fig. 1. Fig. 3 is a transverse section taken on line $y$ $y$ of Fig. 2. Fig. $3^a$ is a detail of the gate for limiting the volume of water when required. Fig. 4 is a section, and Fig. 5 a plan of a modification, showing the application of a reciprocating pump.

Similar letters of reference indicate corresponding parts.

A represents the platform, B the end, C the side, D the bottom or floor, and E one of the seats, of an ordinary street or horse car. F is a steam-generator, standing on the platform, by the side of which is a pair of small, light, and quick-running steam-engines, running, say, five hundred revolutions per minute, and turning the shaft H, which extends along under the car-seat to the middle of the space between the fore and hind wheels, where it connects with a rotary pump, I, which may, in practice, be of any approved kind, but which, in this case, is represented as of that kind of which the forcing apparatus is like two cog-wheels with very long teeth meshing together. Behind the pump, and next to the side of the car-body, is a reservoir, J, for the liquid to be used, which may be water, oil, glycerine, or dextrine, or air may be used, which will not need a reservoir. The pump and this reservoir are connected by a pipe, K, through which the liquid flows into the pump, and in which is a cock, L, valve, gate, or any other device for throttling the liquid or air to regulate the volume admitted to the pump. This cock or valve has a rod, M, extending from it to the engineer's stand on the platform, where it connects with a hand-lever, N, for opening and closing as the liquid is to be increased or diminished. The pump is connected by pipes O with a pressure-wheel or rotary engine, P, on each axle Q, and these pressure-wheels have their exhausts connected with the reservoir by pipes R, so that the liquid drawn from the reservoir by the pump and forced through the wheels returns to the reservoir after doing its work, and goes on working over and over as one of the elements of the machine, and being the means of transmitting the power expended on the pump to the car-wheels. These rotary engines may be of any kind, but, in this case, are represented as a hollow cylinder, $a$, fitted on the axle by stuffing-boxes $b$, so that the axle to which the hub $d$ having the pistons $e$ is attached may revolve, and the two engines are connected by a bar, $f$, entering a socket, $g$, of each wheel to prevent them from turning. $h$ is the abutment, which closes the passage from port to port; $i$, the ports; $j$, the exhaust, and $k$ a reversing-valve. The reversing-valve of both wheels is connected to the rod $l$, which extends to the engineer's stand, and is connected to the reversing-lever $m$, by which the power can be applied to drive the car in either direction.

In practice, the valve $k$ will be arranged so that it cannot rise, and also so that it can close the exhaust-port $i$, at the same time leaving the inlet $i$ open, or partly open, in order that it may be used to stop or brake the car by shutting off the escape of the air or fluid from the wheels.

The maximum speed at any time required of the pressure-wheels P when applied to the driving of a street-car is one hundred revolutions per minute, and the minimum about twenty. If the pump is to run five hundred, as above stated, its capacity will be one to five of that of the two wheels P. When a liquid substance is used for transmitting the power, a good size for the pump would be a capacity of twenty cubic inches per revolution, which would require one hundred inches of capacity for the pressure-wheels P. In this case the throttle L should be adapted to close the pipe so as only to admit four inches for one revolution of the pump when the car-wheels are to slow down to twenty revolutions.

To prevent the pump from working against a vacuum when liquid is used, and the full supply is not admitted, a small air-pipe, $p$, may open into the pump from a height sufficiently above the level of the liquid in the reservoir to prevent the liquid from running out when the pump is stopped. The air thus admitted will be forced along with the liquid through the pressure-wheels, but its great compressibility will prevent its volume from being objectionable. Whatever volume it does make may be compensated for by throttling the supply-pipe a little more. The admission of air in this way will not prevent the pump from taking all the liquid that will pass through the throttle, because the reservoir will be so high that the liquid will flow in by gravity to the exclusion of the air; the air-pipe $p$ may, therefore, always be open to the atmosphere, and will need no attention in the way of opening and closing it. The reservoir will also be open to the atmosphere to allow the air discharging into it, with the liquid from the pressure-wheels, to escape freely. When air alone is used, the pump will have to work against a partial vacuum when the volume is to be diminished, but the loss will not be material, for the area will not be large, although for working air alone the volume capacity of the pump and pressure-wheels will have to be larger than for a liquid.

This improved motor is applicable for driving all kinds of machinery subject to material variations of the load or resistance.

For obtaining the same results by the use of a reciprocating pump, S, Figs. 4 and 5, the pump will be geared to the crank-shaft H by a link, T, and eccentrics U, and the link will have a hand-wheel, W, and screw X, or other contrivance for shifting it to lengthen or shorten the throw of the pump-piston for varying the volume of air or liquid transmitted, the link motion serving in this case the same purpose that the throttle L is used for in the other, and producing the same effect, the long throw giving the maximum volume for the maximum speed, and the shorter throws giving volumes corresponding to their length for corresponding speeds, and having increased effect on the pressure-wheel proportionate to the diminished travel of the pump-piston. It will be desirable to use an air-chamber, $y$, with this form of pump. The rod A' works on a valve in this case to shut off connection of the exhaust in case it may be wanted to do so for a brake to stop the car.

Having thus described my invention, I claim as new and desire to secure by Letters Patent—

1. As a motor for propelling street-cars, traction-engines, omnibuses, &c., the combination of a steam-engine or other motor, a pump and a rotary pressure-wheel, arranged for forcing air or liquids through the pressure-wheels, and thereby producing continuous rotary motion.

2. The combination of a steam-engine or other motor, a pump and a rotary pressure-wheel or engine, arranged for forcing air or liquids through the pressure-wheel, and thereby producing rotary motion, with suitable means for increasing and diminishing the volume of air or liquid admitted to and impelled by the pump.

ANSON P. THAYER.

Witnesses:
C. SEDGWICK,
JAMES H. HUNTER.